United States Patent
Entwistle

(10) Patent No.: US 7,493,299 B2
(45) Date of Patent: Feb. 17, 2009

(54) SYSTEM FOR DELIVERING SCENARIO SPECIFIC, PROBLEM SOLVING, DECISION SUPPORT FROM NON-INTELLIGENT COMPUTER SYSTEMS

(75) Inventor: Martin Patrick Entwistle, Auckland (NZ)

(73) Assignee: Palo Alto Medical Foundation For Health Care, Research, and Education, Palo Alto, CA (US)

( * ) Notice: Subject to any disclaimer, the term of this patent is extended or adjusted under 35 U.S.C. 154(b) by 119 days.

(21) Appl. No.: 10/211,782

(22) Filed: Aug. 1, 2002

(65) Prior Publication Data

US 2003/0037018 A1    Feb. 20, 2003

Related U.S. Application Data

(63) Continuation of application No. PCT/NZ01/00016, filed on Feb. 7, 2001.

(30) Foreign Application Priority Data

Feb. 6, 2000    (NZ) .................................... 337157

(51) Int. Cl.
 *G06N 5/00* (2006.01)
(52) U.S. Cl. ......................................... 706/50; 706/45

(58) Field of Classification Search .................. 706/50, 706/15, 16, 23, 25, 26, 17, 45; 707/103 R; 435/6; 380/282; 600/300
See application file for complete search history.

(56) References Cited

U.S. PATENT DOCUMENTS

| | | | |
|---|---|---|---|
| 5,772,585 A * | 6/1998 | Lavin et al. | 600/300 |
| 5,819,248 A | 10/1998 | Kegan | |
| 6,098,061 A | 8/2000 | Gotoh et al. | |
| 6,658,396 B1 * | 12/2003 | Tang et al. | 706/17 |
| 7,026,121 B1 * | 4/2006 | Wohlgemuth et al. | 435/6 |
| 7,181,017 B1 * | 2/2007 | Nagel et al. | 380/282 |

FOREIGN PATENT DOCUMENTS

| | | |
|---|---|---|
| GB | 2336008 | 10/1999 |
| JP | 11219297 | 8/1999 |

\* cited by examiner

*Primary Examiner*—Wilbert L Starks, Jr.
(74) *Attorney, Agent, or Firm*—Carr & Ferrell LLP

(57) ABSTRACT

A computational decision making system is provided for delivering scenario specific information. Each decision making scenario has a number of variables associated with it and variable values. The system matches a set of input variables to the grouped data objects to find a match or the closest matching grouped data object or objects. Decision information embodying the outcome of a decision making process is associated with each grouped data object and the said decision information associated with the best matching grouped data object or objects is outputted.

25 Claims, 4 Drawing Sheets

SYSTEM FOR DELIVERING SCENARIO SPECIFIC, PROBLEM SOLVING, DECISION SUPPORT FROM NON-INTELLIGENT COMPUTER SYSTEMS

CROSS-RELATED APPLICATIONS

This application claims the benefit of priority under 35 U.S.C. §120 as a continuation of PCT Application No. PCT/NZ01/00016, filed Feb. 7, 2001 (published in English on Aug. 9, 2001 as WO 01/57698), which under 35 U.S.C. §119, claims priority to New Zealand Patent Application No. 337157, filed Feb. 6, 2000, both of which are incorporated by reference herein in their entirety.

FIELD OF THE INVENTION

The present invention relates to decision making or knowledge-based systems. Such systems are part of a movement towards the development of "intelligent" systems for use in problem solving and decision making. Such systems are generally subject independent, although certain applications may be more suitable for implementation using a knowledge-based system than others.

More particularly, although not exclusively, the present invention relates to applied, knowledge-based decision support systems adapted to operate in a computing environment.

BACKGROUND TO THE INVENTION

Decision making is an abstract concept that can generally be thought of as a stimulation/response process usually seen in the context of problem solving. The process is stimulated by a set of information, including for example a set of criteria, a specific question, or a set of factors which define an issue to be addressed. The relevance of each piece of information relating to the problem needs to be gauged, both individually and collectively and ultimately the decision or outcome is made by matching these inputs to rules, knowledge or experience pertinent to the matter in hand.

At a less abstract level, decision making may be thought of as a simple question/answer process whereby an almost infinite potential source of information may be analysed in order to match the question with an answer on an isomorphic (i.e. one-to-one basis). However, many decision making paradigms do not satisfy simple single valued isomorphism as there may be any number of competing variables which may influence or affect the outcome of the decision making process.

Further, the decision making process should conform to an accepted or pre-determined standard or "rule". In an abstract sense, it is increasingly common that decisions are made based on what is known as a "best practise" approach. Such decision making processes may not be necessarily solely focussed on the determination of an empirical answer to a specific question. The process may also or entirely involve subjective answers relating to experience, intuition and instinct (articulated appropriately) which have, over time, been associated with specific criteria or variable patterns and/or values.

Such rules are frequently created and documented by authorities or bodies of experts, or via a meta-analysis of the pertinent body of knowledge. That is, the standards can be evidence-based and can be thought of as including empirical as well as experiential data.

Thus, the standards in effect describe the "rules" around which decisions should be made and are intended to cover all or most of the possible eventualities or variable patterns/values.

In everyday experience, we are often presented with a specific instance of these possible eventualities or a specific example of a pattern of variables with which a decision needs to be made. An example might be determining the probability of precipitation given specific data relating to the present weather. In this case, the eventualities may include variables relating to temperature, humidity, lapse rates and the like. The output of the decision making process may be a probability of precipitation within a set period.

In endeavouring to determine the "best" or optimal decision, it may not be practical to be presented with or have access to the full body of the relevant knowledge and expect to distil from it information relevant to the particular instance or scenario in question. Rather, an effective knowledge-based system should address the specific scenario, be responsive to a users input and provide a clear, relevant and focused decision or output based on the input criteria.

Computer systems provide an ideal environment in which to develop and model knowledge-based systems. Their abilities in relation to data capture and storage, along with rapid search capabilities and other data processing functions make them ideal vehicles for the development and implementation of decision making systems.

It is considered that the prior art solutions do not fully meet the requirements of a flexible decision making system for the following reasons. Prior art techniques are generally unable to provide the specificity and speed required. Such techniques generally use a subject/predicate approach or fuzzy logic, rather than an object based approach, to deliver the required information, and are reductionist in nature rather than attempting to support real world situations.

In addition prior art solutions do not capture a body of expert opinion and make it available so that a less experienced user will be presented with the expert's solution in response to given scenarios in a way that is entirely controllable and reproducible through the way the knowledge base is established and maintained.

Also, prior art architectures are not easily extensible. Such a characteristic is considered desirable in that it allows a variable range of situations or scenarios and a greater depth of information. Generally many prior art systems require that the decision making process and interface be an integral part of the computer program which requires the knowledge base to be itself integrated into the program.

In such models, the knowledge base is not managed in a natural language and is generally concealed from the user. This is particularly problematic when the knowledge and rules exist in a narrative format (e.g. Standard Operating Procedures, protocols etc). An individual with a working knowledge of the area can determine the scenario matches from the advice presented, but would struggle to interpret these as a set of logic based formulae.

To the applicants knowledge, there are no decision making systems which are built on open system principles, whereby any client program conforming to the architecture specification can interact with the knowledge base. The consequence of this is that the accessibility and usability of the system is severely limited. Finally, many prior art systems do not allow real time up updating of the knowledge base. These types of system tend to rely on distributing updates via email or CD ROM. Having the knowledge base reside on a remote server operating on a client/server basis from a central location overcomes these problems.

The applicant is aware of attempts in the past to develop knowledge-based systems. Most deal with methodologies for defining, capturing and storing the knowledge or rules, but are silent on how the stored knowledge may be returned in a real world, situation specific manner.

The Unified Modelling Language (UML) is a notation for Object Oriented Analysis and Design outlined by Booch, Rumbaugh and Jacobsen. This does not identify how stored information is returned in the manner addressed in the proposed solution.

Common Object Request Broker Architecture (CORBA) is an emerging open distributed object computing infrastructure being standardised by the Object Management Group (OMG). CORBA automates many common network programming tasks such as object registration, location and activation, request demultiplexing, framing and error-handling, etc. The CORBA ORB Architecture requires extensive processing time in searching the knowledge base.

In the medical area an example of this is Arden Syntax for Medical Language Modules which provides subject/predicate logic to address very narrowly defined situations, but has no inherent method for returning advice.

Another known technique includes the use of GLIF—the Guideline Interchange Format. This corresponds to a standard architecture for describing a guideline in a reproducible, understandable and shareable format. Further related material may be found in a project established by Stanford Medical Informatics at the University of Stanford, California, known as Protege. This system allows developers to build knowledge-based systems by selecting and modifying reusable problem-solving methods and epistemologies. This system corresponds to a suite of tools that generate domain-specific knowledge-acquisition tools and applications from the epistemologies.

OBJECT OF THE INVENTION

It is an object of the present invention to provide a decision making system which is capable of being distributed across a network, is adaptable and efficient. A further or alternative object of the present invention is to provide a decision making system which overcomes or at least ameliorates some of the deficiencies of the prior art or provides the public with a useful choice.

Further objects of the present invention may become apparent from the following description.

SUMMARY OF THE INVENTION

In one aspect, the present invention provides a computational decision making system suitable for delivering scenario specific information, the decision making system including a matching function to compute a match or closest match between a set of inputted variable information with a plurality of predefined and stored sets of variables, each associated with a predefined scenario, wherein each set of inputted variable information is encapsulated and retained by the system as a grouped data object and wherein the scenario specific information is selected for delivery dependent on which grouped data object or objects has variables that match or most closely match the inputted variable information.

Preferably, the system includes a data entry function to allow creation and retention of further data objects that define additional scenarios in response to the occurrence of one or more particular scenarios.

In a further aspect the invention provides a method of performing a decision making process using a computational system, the method including the steps of:

identifying a plurality of discrete decision making scenarios;

identifying a plurality of decision variables and their values which are relevant as affecting the outcome of a decision making process in relation to each decision making scenario;

collecting the decision variables into one or more computer readable, logically grouped and distinctly identifiable decision data objects;

creating a knowledge base, said knowledge base containing the decision data objects and a set of corresponding decision information embodying the outcome of the decision making process;

receiving through a data input means, input data representative of the values of a plurality of input variables, wherein the input variables correspond to the decision variables;

structuring the input data to form an input data object that has a structure complementary to the structure of the decision data objects;

computing a best matching decision data object to the input data object by comparison of the decision variables and input variables associated with the decision data object and input data object and identifying the corresponding decision information to the best matching decision data object or objects.

Preferably, said decision data object may be structured and handled according to object-oriented or object-relational methodologies.

Preferably, if a plurality of equally best matching decision data objects are computed, the method further includes the step of requesting the input of at least one additional input variable and computing which decision data object best matches the input data object including the at least one more variable.

The method preferably includes the step of passing the input data object to the knowledge base, wherein the knowledge base is structured so that when it is queried using an input data object, a further data object is returned containing only the decision information.

In a preferred embodiment, the decision making scenario each correspond to a particular medical diagnosis or condition, or equally to a combination of medical diagnoses or conditions.

Preferably the best matching decision data object or objects are computed by means of multivariable pattern matching or filtering.

The best matching decision data object may be computed by any other process which compares variable values of the input data object with variable values of the decision data objects to determine whether a match exists.

In a further aspect the invention provides a decision making system including:

a knowledge base, said knowledge base containing a plurality of decision data objects, wherein each of said decision data objects includes a plurality of decision variables, which are identified as relevant in affecting the outcome of a decision making process in relation to a decision making scenario and wherein said knowledge base includes a set of decision information embodying the outcome of the decision making process corresponding to each decision data object;

data input means suitable for receiving data indicative of the value of a plurality of input variables of the same type as the decision variables;

a processing means; and an instruction set readable by the processing means including instructions to cause the processing means to structure the input variables as a grouped input data object, compute a matching or closest matching decision data object to the input data object through comparison of input variables with decision variables and output decision information corresponding to the matching or closest matching decision data object or objects.

Preferably, the set of decision information is structured as a plurality of data objects.

The decision information may be of any length and may be stored in a hierarchy, whereby key points may be linked to further detail, and the further detail can be selectively outputted or selectively extracted from the output for display.

Preferably, the decision information may include a combination of media, including text, tables, graphics, sound.

Preferably, the knowledge base may contain distinct decision data objects having similar variable values or overlapping variable ranges, wherein each set of decision information corresponding to each decision data object having similar variable values or overlapping variable ranges, embodies an outcome of a decision that may or may not overlap with one another, but do not conflict with each other.

Preferably, if a plurality of equally matching decision data objects are computed, the method further includes the step of requesting the input of at least one more variable and computing which decision data object or objects best matches the input data object including the at least one more variable.

Preferably each decision data object may belong to a class, wherein each class is determined by the type or value of variables required to identify a match with the decision data objects and wherein the knowledge base is structured hierarchically according to class.

The exact nature of the software solution which can be conceived is not predetermined and may be implemented in a number of different methodologies.

The system may collect the input data object from a separate database or via an interface at the time of use.

The knowledge base may be implemented using a variety of software, which might include object, object-relational and relational bases having an appropriate structure.

In a preferred embodiment, the decision making scenario corresponds to a particular medical diagnosis or condition, or equally to a combination of medical diagnoses or conditions.

In a preferred embodiment, the system includes:
a data input means which presents an input form to collect the value of input variables, wherein the processing means extracts the variable values from the input form to create the input data object or objects;
a search engine or engines which pass the input data object or objects to the knowledge base and return a search output indicative of the matching or closest matching decision data object or objects; and
an output form through which at least the decision information is communicated.

Preferably the search engine operates by means of multivariable pattern matching, or filtering.

The input form, knowledge base and output form may be combined or in separate applications.

The input form, the knowledge base and output form may be located at the same spatial location or physically remote from each other, in which case they are connected by a network.

Preferably, the system architecture includes coding or structure which allows the output to be transmitted to or interrogated by one or more third party applications.

Preferably the system architecture includes an editorial tool adapted to allow the input, management, update and customisation of the knowledge base.

Preferably the editorial tool may be designed so as to be useable at least by individuals familiar with the area but unskilled in the translation of scenarios into logic statements.

Preferably the editorial tool organises information in the knowledge base so that the decision data object fits the object structure which is defined for each input form.

The system may be programmed in such a way that the knowledge base is editable without necessarily reprogramming or recompiling any other elements of the system.

In a further aspect the invention provides a method of creating a decision making system in a computational system, the method including the steps of:
identifying a plurality of discrete decision making scenarios;
identifying a plurality of decision variables which are identified as relevant in affecting the outcome of a decision making process in relation to each decision making scenario;
collecting the decision variables into one or more computer readable logically grouped decision data objects, said one or more decision data objects structured and handled according to object oriented or object relational methodologies;
creating a knowledge base, said knowledge base containing the decision data objects and a set of corresponding decision information embodying the outcome of the decision making process;
providing a data input means suitable for receiving data indicative of the value of a plurality of input variables;
providing a computer readable instruction set suitable for causing a computer processing means to structure the input variables as a grouped input data object, compute a matching or closest matching decision data object to the input data object and output the corresponding decision information to the matching or closest matching decision data object or objects.

Preferably, the method includes structuring and handling the decision data objects in a computational environment according to object oriented or object relational methodologies.

Further aspects of the present invention may become apparent from the following description, given by way of example and in reference to the accompanying drawings.

BRIEF DESCRIPTION OF PREFERRED
EMBODIMENTS OF THE INVENTION

The present invention is particularly suitable in contexts where decision making is critical and the knowledge on which the decisions are to be made is extensive, dynamic, distributed or dispersed and difficult to retain.

Clinical medicine is a prime example of such a situation.

Thus, although it is envisaged that the present decision making system may find application in a large number of situations, the following description will focus primarily on clinical medicine. This application illustrates well the operation and applicability of the present invention to this and analogous applications.

Health care implementation is increasingly being driven by the principles of evidence-based-practice. That is—the idea that clinical management decisions should be based on what is known as "best practice" where medical interventions have shown to produce a demonstrable positive impact on the outcomes which are to be achieved.

Considerable efforts are being made to gather and evaluate such evidence which, to be effective, must be available at a time and in a form where it can promote a change in behaviour in respect of the practitioners using this information. This is not readily achievable with the currently available information/knowledge systems.

Characteristics of the present invention include the capability for delivering patient specific clinical management prompts (i.e. "decision support") at the time of decision making. This technique is recognised to be the most effective method for changing behaviour. Further, the present invention provides a way to associate the patient management system and clinical decision knowledge bases. This facilitates professional management, maintenance and updating of other clinical support information. Further, the structure of the decision making system according to the preferred embodiment of the present invention promotes functions such as reporting, feedback and monitoring capabilities outcomes and performance.

In terms of implementing the present invention, recent (and projected) increases in available bandwidth along with the associated supporting technology means that it is now feasible to build the present knowledge base system in such a way that would allow real time transactions at the required volumes. Further, the knowledge bases and transaction servers can be, though not necessarily, remote from the providers machines (i.e. the user interfaces) resulting in an increase in efficiency in the management of the knowledge base data. In the view of the applicant, open systems are important to these developments and it is envisaged that this will be the communication model which is most suitable for the implementation of the present invention.

Figure 1:
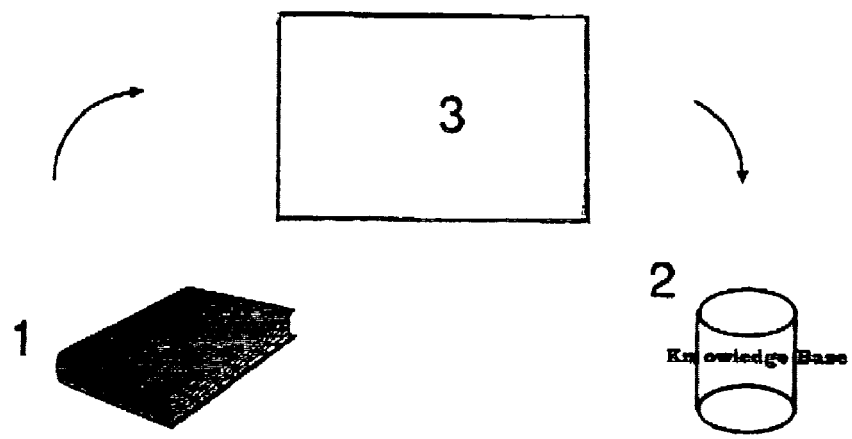
FIG. 1: illustrates a representation of the editorial function of the system—creation of the knowledge base.

The first step in implementing the present decision making system is the creation of a suitable knowledge base. This process is illustrated in FIG. 1, whereby a knowledge base 2 is created using evidence-based guidelines for the management of a specific disease or condition. This information or data would normally be articulated as a large body of (usually printed) information relevant to a decision associated with a particular scenario, protocols for handling the scenario, and the like, generally referenced 1. Relevant information to a decision making process is identified and used to define a range of discrete clinical scenarios.

Information relevant to making decisions for the management of a scenario, is defined as a set of variables and entered into the knowledge base 2. Decision information embodying the outcome of one or more decisions that need to be made in the scenario in question, is also entered into the knowledge base 2 through an input template 3. The appropriate decision information may vary depending on the values of the variables and therefore, the decision information is structured so that only the appropriate information can be identified in the occurrence of a particular pattern of variables.

A particular scenario for example, may be the evaluation of a patient with a specific set of medical conditions, displaying a number of symptoms. Thus, variables may include, among other things: whether or not a patient is an asthmatic; whether they are suffering from a cough; whether they have coughed up a particular coloured phlegm; and the duration of the condition. Faced with this scenario, the outcome of the decision as to an appropriate treatment may depend on any or all of these variables. The variables may be binomial in character, for example, the patient either is or is not an asthmatic, or allow a range of values, for example the duration of the cough.

The variables required for identifying the appropriate decision information are distilled from protocols and like and edited into the knowledge base according to a predefined hierarchy. For example, the variable of the colour of the phlegm may be located in the next lower level below the variable of whether or not the patient has a cough. Thus, a series of input screens may be displayed or queries for input information sent in order to obtain values for variables at all required levels of the hierarchy. Support information, which may be required to assist in identification of the variables is also entered into the knowledge base where required for use in guiding a user to the correct identification of the required variables. For example, a test may need to be performed before a variable can be identified and the support information may include instructions on how or where to obtain the results of the test.

The decision information may also be arranged in a hierarchy. For example, an important aspect of the decision information may have a link to a more detailed description of that aspect, which in turn may have more links to related subjects. Using the system in this way, a user may learn about the same and related scenarios, expanding their knowledge.

Figure 4:
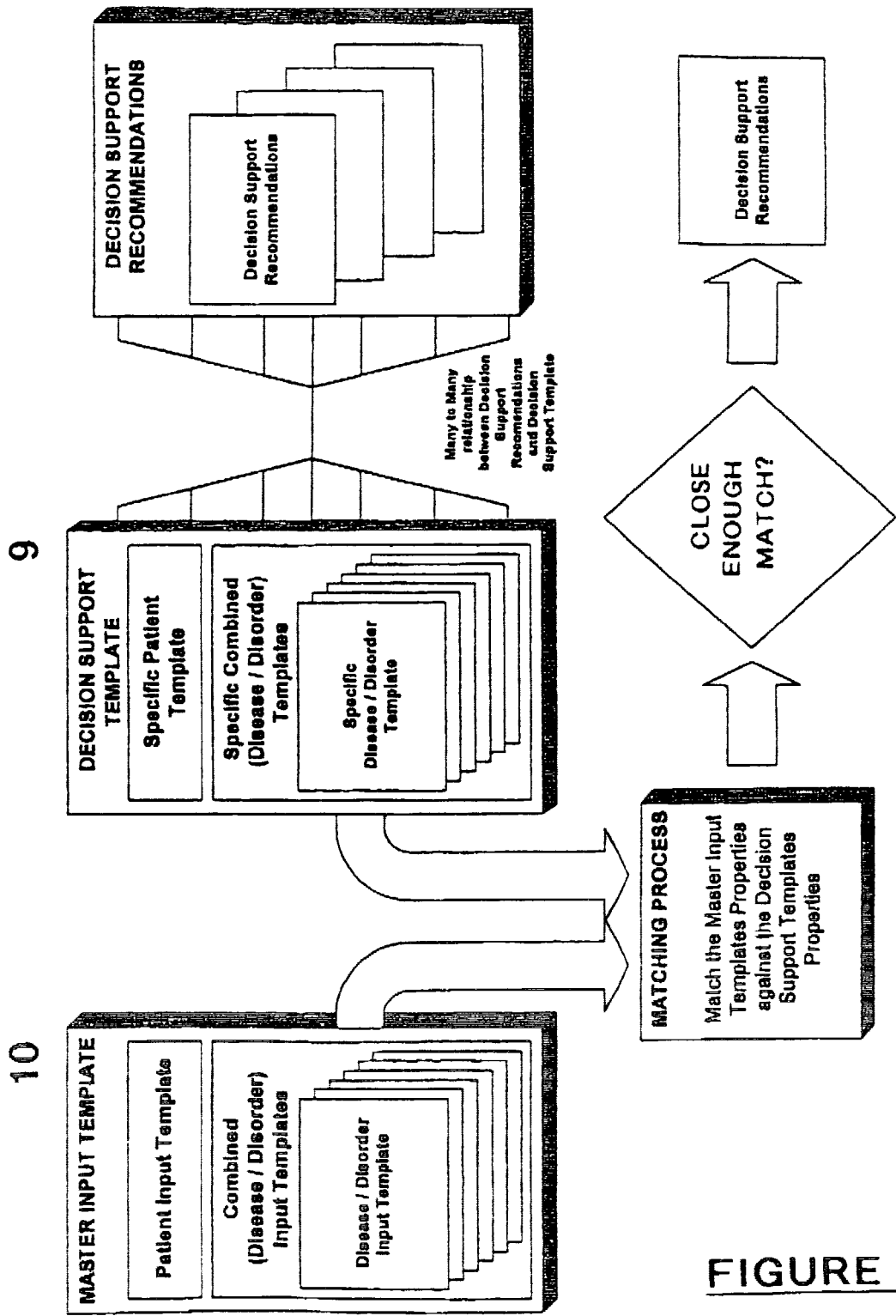
FIG. 4: illustrates schematically the decision process according to the system.

Referring now to FIG. 4, in effect, the inputting of a set of variables associated with each scenario forms a template, hereinafter decision template 9, which is stored in the knowledge base 2. The decision template 9 incorporates the variables and information relating to the variable values and/or range of variable values which can be identified with a particular clinical scenario. Thus, each variable is defined by its type, which identifies the parameter to be measured or described, and by its value, which quantifies the existence of a particular fact or quantifies the variable when the variable could have three or more values. A user inputs the values of variables to form an input template 10. The structure of the input template 10 is complementary to the decision template 9 to allow comparison of the values of the variables in each template.

The decision templates 9 may thus also be arranged in a hierarchy, determined by the type of each template 9. Templates 9 belonging to a particular class may be grouped according to that class and the user may select the class and therefore the templates 9 to which their variable information is to be compared. The input template 10 may vary in form depending on the type of decision template 9 that is to be searched for a match or closest match.

Thus, both the input data object and decision data object are logically identifiable, grouped portions of data. The decision data objects may each be defined in the knowledge base as a distinct object, in which case it is directly amenable to treatment according to object oriented methodologies, which focus on groups of related data or processes. The decision information embodying the outcome of a decision should an input data object match a specific decision data object is stored in relation to the decision data object, preferably as a distinct data object itself. In an alternative embodiment, the decision data objects may be stored in tables in a relational database, with the variables listed as specific entries in the table and the decision information corresponding to each decision data object stored in a related table. In this case, each decision data object is defined by a number of entries in the table and these entries are treated as a grouped distinct data object in accordance with object-oriented or object-relational methodologies.

The outcome of the decision making process, embodied in the decision information may include, for example a list of a course of actions, recommendations, or comments appropriate to the particular scenario. This information is inputted together with the decision information as a separate data object linked to at least one decision template. The data objects containing decision information are stored in a many-to-many relationship with the decision templates 9.

Figure 2:
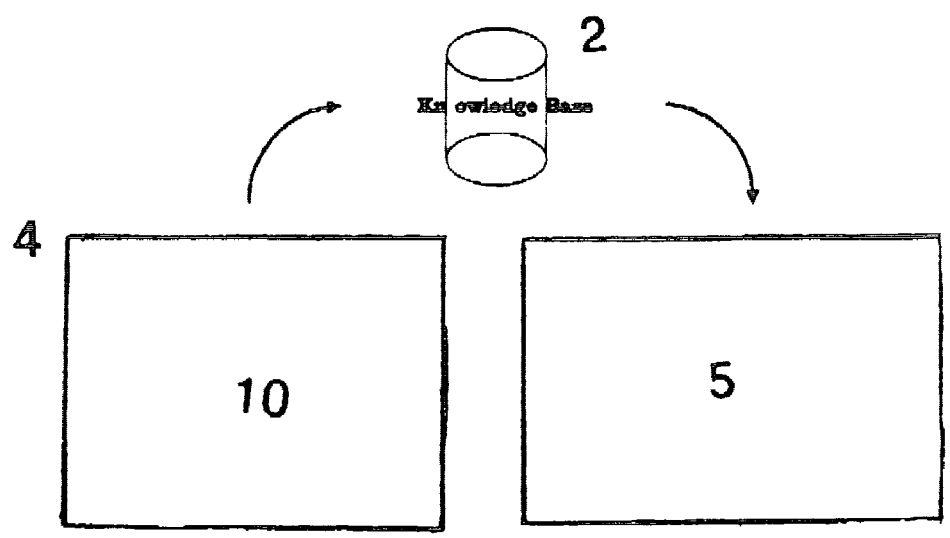
FIG. 2: illustrates schematically the passing of an input data object to the knowledge base whereupon data output in the form of management forms is produced.

To query the decision making system, what is known as the "clinical support system" is used. This is illustrated in FIG. 2. This component includes the end-user input interface 4 of the system and entails inputting patient specific features in the form of an electronic record. This information is entered by means of a predetermined input form or input template 10, which requests information based on the variables which are required to identify a set of decision information for extraction from the knowledge base to the data output 5.

A practitioner enters the variable data, ranges of variable data, flags or other information. Alternatively, this information is populated from another information source or base. Once this template is completed, pattern matching, variable matching or similar is used to identify previously compiled or entered decision information which is then output, for example as a set of "patient management prompts". An appropriate search engine may be used to search the decision information and associated variables for a match. It is not obligatory that the template physically exists nor that it is visually presented to the system user. The required variables could be collected in a virtual manner and passed unseen to the knowledge base.

The function of the search engine can be broadly described as attempting to match a patients particular clinical scenario with a previously existing scenario or scenarios which are stored in the knowledge base. At a broad level, this can be thought of as a search for an abstract volume of information embodying a previously determined clinical condition matching that of the presently unknown clinical condition. The output data is in the form of patient specific management prompts which embody the clinical determinations or decisions which are required by the practitioner.

In many cases, the best matching decision data object may not be sufficient, or may provide incorrect information. This is especially apparent in a medical diagnostic system. Therefore, the decision making process or system may be limited to only output decision information if the inputted variables match exactly with a decision data object or fall within a range defined by a decision data object. Alternatively, individual critical decision data objects may require such an exact match, whereas less critical decision data objects may allow the decision information to be displayed if an exact match is not obtained, with a warning of a lack of an exact match and identification of the variables that do not match.

Figure 3:
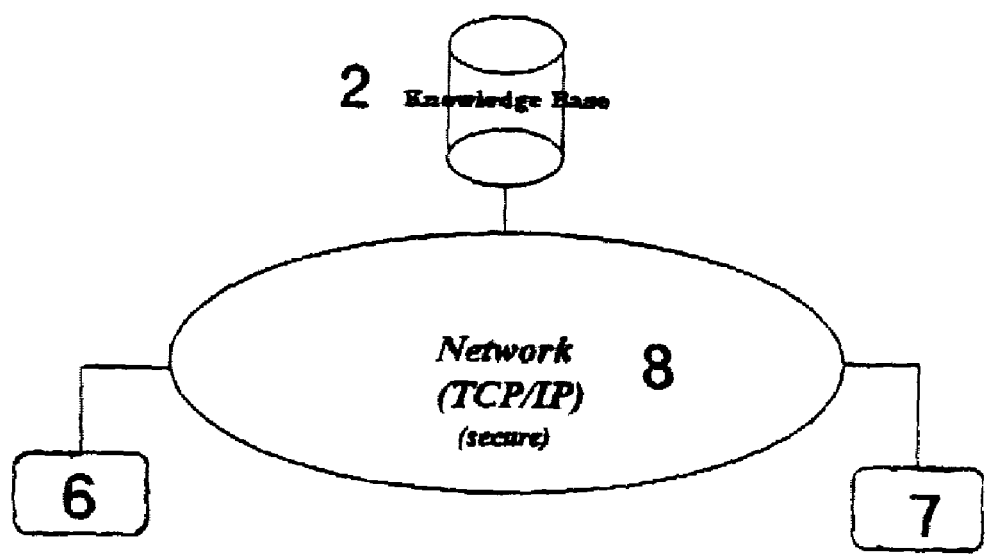
FIG. 3: illustrates a simplified schematic of the knowledge base operating on a network.

The decision making system support architecture can be in the form of a distributed system whereby patient management systems are linked via secure networks to an application server which delivers the clinical support information. As noted above, the connection is preferably implemented using an open systems architecture such as TCP/IP or the like. This is illustrated in FIG. 3, where a number of general practitioners, collectively referenced by box 6 and a hospital 7 communicate using a communications network with the knowledge base 2. The communications network may be an intranet or use a wide area network such as the Internet. However, to prevent misuse of information from the knowledge base and preserve privacy of information, the communication channel should be secure.

Figure 5:
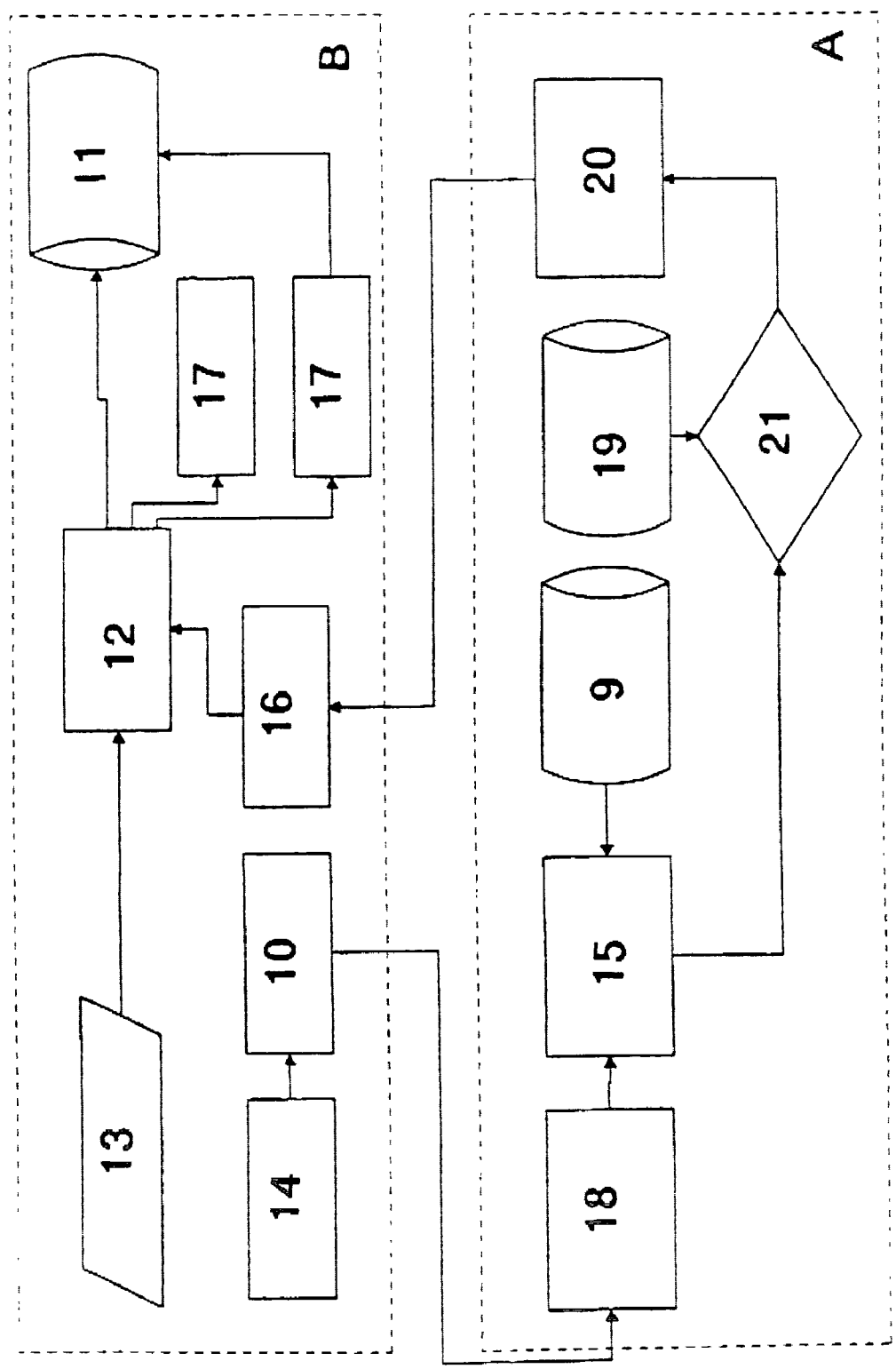
FIG. 5: illustrates a schematic layout of a practical implementation of the present system.

Referring to FIG. 5, the decision making system, referenced by Box A may interface to an existing patient management system B. The existing system B includes information relating to the patient including patient data 11, a separate patient management functionality 12 and an input 13 to allow entry of patient and patient disease and disorder data. The function of providing an input template 14 may be provided by the patient management system B, allowing individual end users to custom design their own templates. This results in the formation of a master input template 10 in a form readable by the decision system of the present invention. The patient management system receives the decision information 16 and displays the recommendations 17 through an appropriate display device and stores the recommendations 17 to supplement the patient data 11.

The decision making system receives the master input template 10 through an interface 18, matches it with a decision data object 9 in step 15, extracts the corresponding decision information 19 and sends this information to the patient management system in step 20. Optionally, a decision is made whether to forward the decision information 19 depending on the closeness of the match in step 21.

The present invention may include the development of an editorial tool which conforms to the system architecture. It is envisaged that this tool will allow the reuse of object components already in existence for related projects, such as a drug object for the management of one condition to be applied to an unrelated condition where the same drug is required. It is further envisaged that a wide-range of standard input forms will be developed in order to handle pre-defined scenarios. A consequence of the approach to the present system is that the input forms, knowledge bases and output forms could be created by different organisations following the particular architecture standard. The application modules could thus be implemented so as to be readily interact with the knowledge base and its components. Further, as noted above, the present invention has been described in a particular application—that of clinical medicine. However, the principles of the invention are equally applicable to any decision making environment where knowledge exists to provide a defined set of information in discreet decision making scenarios or situations. Further, examples may be the law, engineering, manufacturing or the like.

The same principles may also be applied in more uncertain situations to define a response should a set of variables ever occur in a certain pattern, even if this has never been previously experienced. This has relevance, amongst other areas, to the field of science and engineering in the iterative analysis of multivariate problems.

A particular advantage of the present system includes the creation of an efficient and effective decision making system which provides scenario specific advice based on previously read rules, guidelines and protocols. The information in the knowledge base is available at the time of the decision making and may be adapted to deliver common messages following standard formats, content and instructions. Due to the relative simplicity and association of the various components, it is envisaged that the present decision making system may be integrated with existing systems depending on those systems architecture.

Another advantage of the present system includes the speed with which multiple output objects can be matched to the input object. The matching process avoids complex and time consuming looped searches, resulting in enhanced functionality.

A further advantage of the system is that it lends itself to the handling of decision making on the face of multi-faceted scenarios, which currently available systems struggle to address, but pattern matching provides a more effective solution.

A further advantage of the present invention is that it's architecture allows the knowledge base to be modified without the other elements of the system needing to be reprogrammed or recompiled in any way. Further, a consequence of having a centrally accessible knowledge base dispenses with the need of distributing up-to-date data to the users in piecemeal form and at sporadic intervals. This also removes the obvious problems associated with those techniques whereby revision tracking and the necessity to keep the information up to date is paramount.

Thus the present invention provides a novel decision making system which is flexible and based primarily on "best practice", rules, knowledge and experience. Of course the system could be implemented using any suitable programming environment. No specific details will be given as it is considered that any specific implementation will be within the ambit of those who are skilled in the art.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the appended claims.

The invention claimed is:

1. A computer system comprising:
a matching function module to compute a match or closest match between a set of inputted variable information with a plurality of predefined sets of variables, each set of variables associates with a predefined clinical scenario for a patient with a specific set of medical conditions, each variable being defined by a parameter to be measured or described and by a value of the parameter, wherein each predefined set of variables is encapsulated and retained by the system as a grouped data object and wherein specific clinical management decision information is selected for output dependent on which grouped data object or objects include variables that match or most closely match the inputted set of variable information and wherein the match or closest match is computed by means of multivariable pattern matching or filtering;
a data function module to create and retain further data objects defining additional predefined information in response to the at least one of the selected specific clinical management decision information and inputted variables; and
an output module to output the specific clinical management decision information to a user.

2. The computer system of claim 1 wherein the clinical management decision information output to a user includes a recommendation.

3. A method of performing a patient specific clinical management decision making process using a computational system, the method comprising:
identifying a plurality of discrete data sets of specific clinical management decision information;
identifying a plurality of decision variables and their values which are relevant as affecting the outcome of a clinical management decision making process in relation to each of the discreet data sets, each variable being defined by a parameter to be measured or described and by a value of the parameter;
collecting the decision variables into one or more computer readable, logically grouped decision data objects;
creating a clinical medicine decision knowledge base, said knowledge base containing the decision data objects and a set of corresponding discrete data sets of specific clinical management decision information embodying the outcome of the decision making process;
receiving, from an input device, input data representative of the values of a plurality of input variables associated with a predefined clinical scenario for a patient with a specific set of medical conditions, wherein the input variables correspond to the decision variables;
structuring the input data to form an input data object that has a structure complementary to the structure of the decision data objects;
using a matching function to compute a best matching decision data object to the input data object using multivariable pattern matching or filtering to compare the decision variables and input variables associated with the decision data object and input data object and identifying the corresponding discrete data set of specific clinical management decision information to the best matching decision data object or objects; and
outputting the discrete data set to a user.

4. The method of performing a decision making process of claim 3, wherein said decision data object is structured and handled according to object-oriented or object-relational methodologies.

5. The method of performing a decision making process of claim 3, wherein if a plurality of equally best matching decision data objects are identified, the method further includes the step of requesting the input of at least one additional input variable and computing which decision data object or objects best match the input data object comprising the at least one additional input variable.

6. The method of performing a decision making process of claim 3, further including passing the input data object to a clinical medicine decision knowledge base, wherein the knowledge base is structured so that when the knowledge base is queried using an input data object, a further data object or objects are returned containing relevant clinical management decision information.

7. The method of performing a decision making process of claim 3, wherein each discrete data set corresponds to one of a particular medical diagnosis or condition, and a combination of medical diagnoses or conditions.

8. The method of performing a decision making process of claim 3 further including providing a recommendation with the output to a user.

9. A computer system comprising: a clinical medicine decision knowledge base module comprising a plurality of decision data objects, wherein each of said decision data objects includes a plurality of decision variables, each variable being defined by a parameter to be measured or described and by a value of the parameter and wherein said knowledge base includes a set of specific clinical management decision information embodying the outcome of the decision making process corresponding to each decision data object;

a data input device to input data indicative of the value of a plurality of input variables of the same type as the plurality of decision variables, the input variables being associated with a predefined clinical scenario for a patient with a specific set of medical conditions;

a processor; and a computer readable medium comprising instructions to cause the processor to structure the input variables as a grouped input data object, compute a matching or closest matching decision data object or objects to the input data object using multivariable pattern matching or filtering to perform a comparison of input variables with decision variables and output specific clinical management decision information corresponding to the matching or closest matching decision data object or objects.

10. The computer system of claim 9, wherein the set of decision information is structured as a plurality of data objects.

11. The computer system of claim 9, wherein the decision information is stored in a hierarchy, whereby selected data portions of the decision information are linked to further detailed data, and the further detailed data is selectively outputted or selectively extracted for output.

12. The computer system of claim 9, wherein the decision information includes a media selected from the group consisting of text, tables, graphics, sounds, and combinations thereof.

13. The computer system of claim 9, wherein the clinical medicine decision knowledge base module contains distinct decision data objects having similar variable values or overlapping variable ranges, wherein each set of specific clinical management decision information corresponding to each decision data object having similar variable values or overlapping variable ranges do not conflict with each other.

14. The computer system of claim 9, wherein if a plurality of equally matching decision data objects are computed, an output module of the system outputs a request for at least one additional input variable and computes which decision data object or objects best matches the input data object comprising the at least one additional input variable.

15. The computer system of claim 9, wherein each decision data object belongs to a class, wherein each class is determined by the type or value of variables required to identify a match with the decision data objects and wherein the knowledge base is structured hierarchically according to class.

16. The computer system of claim 9, wherein the clinical medicine decision knowledge base module is implemented using any one or a combination of object, object-relational and relational bases having an appropriate structure.

17. The computer system of claim 9, wherein the decision making system is used for one of a medical diagnosis or condition, and a combination of medical diagnoses or conditions.

18. The computer system of claim 9, wherein the data input device extracts the input variable values from an input form to create the input data object or objects.

19. The computer system of claim 9, wherein the output is transmitted or interrogated by one or more third party applications.

20. The computer system of claim 9, wherein the system includes an editorial tool module adapted to allow the input, management, update and customization of the knowledge base.

21. The computer system of claim 20, wherein the editorial tool organizes information in the knowledge base module so that the decision data object fits the object structure which is defined for each input form.

22. The computer system of claim 9 wherein the clinical management decision information output to a user includes a recommendation.

23. A computer implemented patient specific clinical management decision method on computer readable medium comprising instructions to cause a computer to:

identify a plurality of discrete data sets of specific clinical management decision information;

identify a plurality of decision variables which are identified as relevant in affecting the outcome of a clinical management decision making process in relation to each discrete data set, each variable being defined by a parameter to be measured or described and by a value of the parameter;

collect the decision variables into one or more computer readable logically grouped decision data objects, said one or more decision data objects structured and handled according to object oriented or object relational methodologies;

create a clinical medicine decision knowledge base, said knowledge base containing the decision data objects and a set of corresponding specific clinical management decision information embodying the outcome of the decision making process;

provide a data input means suitable for receiving data indicative of the value of a plurality of input variables associated with a predefined clinical scenario for a patient with a specific set of medical conditions; and provide a computer readable instruction set suitable for causing a computer to structure the input variables as a grouped input data object, compute a matching or closest matching decision data object or objects to the input data object by multivariable pattern matching or filtering using a matching function and output the corresponding specific clinical management decision information to the matching or closest matching decision data object or objects to a user.

24. The computer implemented method of claim 23, wherein the method includes structuring and handling the decision data objects in a computational environment according to object oriented or object relational methodologies.

25. The computer implemented method of claim 23 further including providing a recommendation with the output to a user.

* * * * *